(12) United States Patent
Liang et al.

(10) Patent No.: US 12,106,870 B2
(45) Date of Patent: Oct. 1, 2024

(54) CARBON NANOSCALE FIBER-BASED MATERIALS AND METHODS

(71) Applicant: Florida State University Research Foundation, Inc., Tallahassee, FL (US)

(72) Inventors: Zhiyong Liang, Tallahassee, FL (US); Jin Gyu Park, Tallahassee, FL (US); Songlin Zhang, Tallahassee, FL (US); Ayou Hao, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 16/751,448

(22) Filed: Jan. 24, 2020

(65) Prior Publication Data

US 2020/0286646 A1    Sep. 10, 2020

Related U.S. Application Data

(62) Division of application No. 15/491,188, filed on Apr. 19, 2017, now Pat. No. 10,586,629.

(51) Int. Cl.
| | |
|---|---|
| *H01B 5/10* | (2006.01) |
| *B82Y 30/00* | (2011.01) |
| *B82Y 40/00* | (2011.01) |
| *H01B 1/04* | (2006.01) |
| *H01B 1/12* | (2006.01) |

(52) U.S. Cl.
CPC ............. *H01B 5/10* (2013.01); *B82Y 30/00* (2013.01); *B82Y 40/00* (2013.01); *H01B 1/04* (2013.01); *H01B 1/124* (2013.01)

(58) Field of Classification Search
CPC ....... B82Y 30/00; B82Y 40/00; Y10T 428/29; Y10T 428/2913; Y10T 428/2918; Y10T 428/292; Y10T 428/2982; Y10T 428/2991; Y10T 428/2998; Y10T 428/30; H01B 5/10; H01B 1/04; H01B 1/124
USPC ....... 977/734, 737, 740, 742, 745, 748, 750, 977/751, 752, 753, 778; 442/110
See application file for complete search history.

(56) References Cited

U.S. PATENT DOCUMENTS

| | | | |
|---|---|---|---|
| 2010/0227155 A1* | 9/2010 | Bao ........................ | B29C 70/14 156/196 |
| 2012/0148835 A1* | 6/2012 | Radkowski .............. | C09D 5/24 977/932 |
| 2016/0216818 A1* | 7/2016 | Yang ....................... | G06F 3/041 |

OTHER PUBLICATIONS

Liu, et al., "Multi-property enhancement of aligned carbon nanotube thin films from floating catalyst method," Materials and Design 108 (2016) pp. 754-760 (Year: 2016).*

Cheng et al. "High Mechanical Performance Composite Conductor: Multi-Walled Carbon Nanotube Sheet/Bismaleimide Nanocomposites", Advanced Functional Materials 2009, 19, 3219-3225.

(Continued)

*Primary Examiner* — Matthew D Matzek
(74) *Attorney, Agent, or Firm* — Eversheds Sutherland (US) LLP

(57) ABSTRACT

Provided herein are composite materials and methods of making composite materials including carbon nanoscale fiber networks. The composite materials may include a stretched and doped carbon nanoscale fiber network and a capping layer. The methods of making the composite materials may include stretching a carbon nanoscale fiber network, contacting the nanoscale fiber network with a dopant, and disposing a capping layer on a surface of the carbon nanoscale fiber network.

18 Claims, 9 Drawing Sheets

(56) References Cited

OTHER PUBLICATIONS

Dettlaff-Weglikowska et al. "Effect of SOCl2 Treatment on Electrical and Mechanical Properties of Single-Wall Carbon Nanotube Networks", Journal of American Chemical Society 2005, 127(14), 5125-5131.
Downes et al. "Strain-Induced Alignment Mechanisms of Carbon Nanotube Networks", Advanced Engineering Materials 2015, 17, 3, 349-358.
Downes et al. "Geometrically constrained self-assembly and crystal packing of flattened and aligned carbon nanotubes", Carbon 2015, 93, 953-966.
Ebbeson et al. "Electrical conductivity of individual carbon nanotubes", Nature 1996, 382, 54-56; doi:10.1038/382054a0.
Jackson et al. "Stability of Doped Transparent Carbon Nanotube Electrodes", Advanced Functional Materials 2008, 18, 2548-2554.
Janas et al. "Iodine monochloride as a powerful enhancer of electrical conductivity of carbon nanotube wires" Carbon 2014, 73, 225-233.
Lekawa-Raus et al. "Electrical Properties of Carbon Nanotube Based Fibers and Their Future Use in Electrical Wiring", Advanced Functional Materials 2014, 24, 3661-3682.
Tonkikh et al. "Metallization of single-wall carbon nanotube thin films induced by gas phase iodination", Carbon 2015, 94, 768-774.
Zhao et al. "Iodine doped carbon nanotube cables exceeding specific electrical conductivity of metals", Scientific Reports 2011, 1, 83; doi:10.1038/srep00083.

\* cited by examiner

CARBON NANOSCALE FIBER-BASED MATERIALS AND METHODS

CROSS-REFERENCE TO RELATED APPLICATIONS

This application is a division of U.S. patent application Ser. No. 15/491,188, filed Apr. 19, 2017, which is incorporated herein by reference.

STATEMENT REGARDING FEDERALLY SPONSORED RESEARCH OR DEVELOPMENT

This invention was made with government support under contract number 1344672 awarded by the National Science Foundation, and contract number FA9550-17-1-0005 awarded by the Air Force Office of Scientific Research. The U.S. government has certain rights in the invention.

BACKGROUND

Lightweight and corrosion-resistant nonmetal electrical conductors are desirable for applications in many industries, including, for example, the aerospace, electronics, medical device, and marine instrument industries.

Current electrical signal or power lines include copper and an insulating layer. Large diameter, highly dense copper cables, however, are relatively heavy, which is especially disadvantageous in aircraft containing miles of cables. In some transformer applications, aluminum, which is lighter than copper, has been used, but lighter and/or corrosive resistant materials are desirable.

Due to several attributes of carbon nanotubes (CNTs), such as their low density, one dimensional structure, tunable electrical properties, and/or high mechanical performance, various scales of CNTs and CNT assemblies have been studied for possible use in electrical conduction applications, including, for example, individual CNTs and macroscale CNT assemblies, such as yarns (i.e., fibers), sheets, and ribbons.

Although the electrical conductivity of an individual CNT can be as high as $10^6$ S/cm for a single-wall CNT (SWNT), and $3.3 \times 10^4$ S/cm for a multi-wall CNT, macroscopic CNT assemblies have shown limited conductivity. Typically, CNT fibers have demonstrated better electrical performance than CNT sheets, which are required for scaled-up engineering applications, such as surfaces for aircraft fuselage and wind blades. For some CNT sheets, the electrical conductivity can be significantly reduced from about $10^4$ S/cm to about $10^2$ S/cm when the thickness of the sheet is increased from a nanometer scale to a micrometer or millimeter scale.

Other materials, such as iodine, have been added to CNT sheets in an effort to improve electrical conductivity. These other materials, however, typically have poor air stability and/or do not remain in place during the use of the CNT sheets.

There remains a need for composite materials that take advantage of the properties of carbon nanotubes, and are stable, scalable, lightweight, highly conductive, and/or capable of being produced with facile and/or scalable processes.

BRIEF SUMMARY

In one aspect, methods of making composite materials that may be stable, highly conductive, and/or lightweight are provided. In embodiments, the methods comprise providing a carbon nanoscale fiber network which comprises a plurality of randomly oriented carbon nanoscale fibers; stretching the carbon nanoscale fiber network to align at least a portion of the plurality of randomly oriented carbon nanoscale fibers, wherein the stretching of the carbon nanoscale fiber network imparts the carbon nanoscale fiber network with a stretch ratio of about 10% to about 70%; contacting the carbon nanoscale fiber network with a dopant under conditions that cause the dopant to (i) adsorb to one or more surfaces of the carbon nanoscale fiber network, (ii) penetrate the carbon nanoscale fiber network, or (iii) a combination thereof; and disposing a capping layer on at least a surface of the carbon nanoscale fiber network. The dopant may comprise an oxidant, and the capping layer may comprise a conductive polymer. The stretching of the carbon nanoscale fiber network and the contacting of the carbon nanoscale fiber network with the dopant may be effective to increase the electrical conductivity of the carbon nanoscale fiber network comprising the plurality of randomly oriented carbon nanoscale fibers by at least 10×.

In embodiments, the methods comprise providing a carbon nanoscale fiber network which comprises a plurality of randomly oriented carbon nanotubes; stretching the carbon nanoscale fiber network to align at least a portion of the plurality of randomly oriented carbon nanotubes to form a stretched carbon nanoscale fiber network, wherein the stretching of the carbon nanoscale fiber network imparts the carbon nanoscale fiber network with a stretch ratio of about 10% to about 70%; contacting the stretched carbon nanoscale fiber network with a dopant to form a doped carbon nanoscale fiber network, the contacting occurring under conditions that sublimate the dopant, and cause the dopant to (i) adsorb to one or more surfaces of the stretched carbon nanoscale fiber network, (ii) penetrate the stretched carbon nanoscale fiber network, or (iii) a combination thereof; and submerging at least a portion of the doped carbon nanoscale fiber network in a mixture comprising a liquid and a capping layer to dispose the capping layer on at least a surface of the doped carbon nanoscale fiber network, wherein the capping layer comprises a conductive polymer. The stretching of the carbon nanoscale fiber network and the contacting of the carbon nanoscale fiber network with the dopant may be effective to increase the electrical conductivity of the carbon nanoscale fiber network comprising the plurality of randomly oriented carbon nanoscale fibers by at least 10×.

In another aspect, composite materials are provided. In embodiments, the composite materials comprise a carbon nanoscale fiber network comprising a plurality of substantially aligned carbon nanoscale fibers; a dopant adsorbed to one or more surfaces of the carbon nanotube fiber network, dispersed within the carbon nanotube fiber network, or a combination thereof; and a capping layer disposed on at least one surface of the carbon nanoscale fiber network; wherein the dopant is present in the composite material in an amount of about 1% to about 25% by weight, based on the combined weight of the dopant and the plurality of substantially aligned carbon nanoscale fibers, and the electrical conductivity of the composite material is about 5,000 S/cm to about 50,000 S/cm.

DETAILED DESCRIPTION

Figure 1:
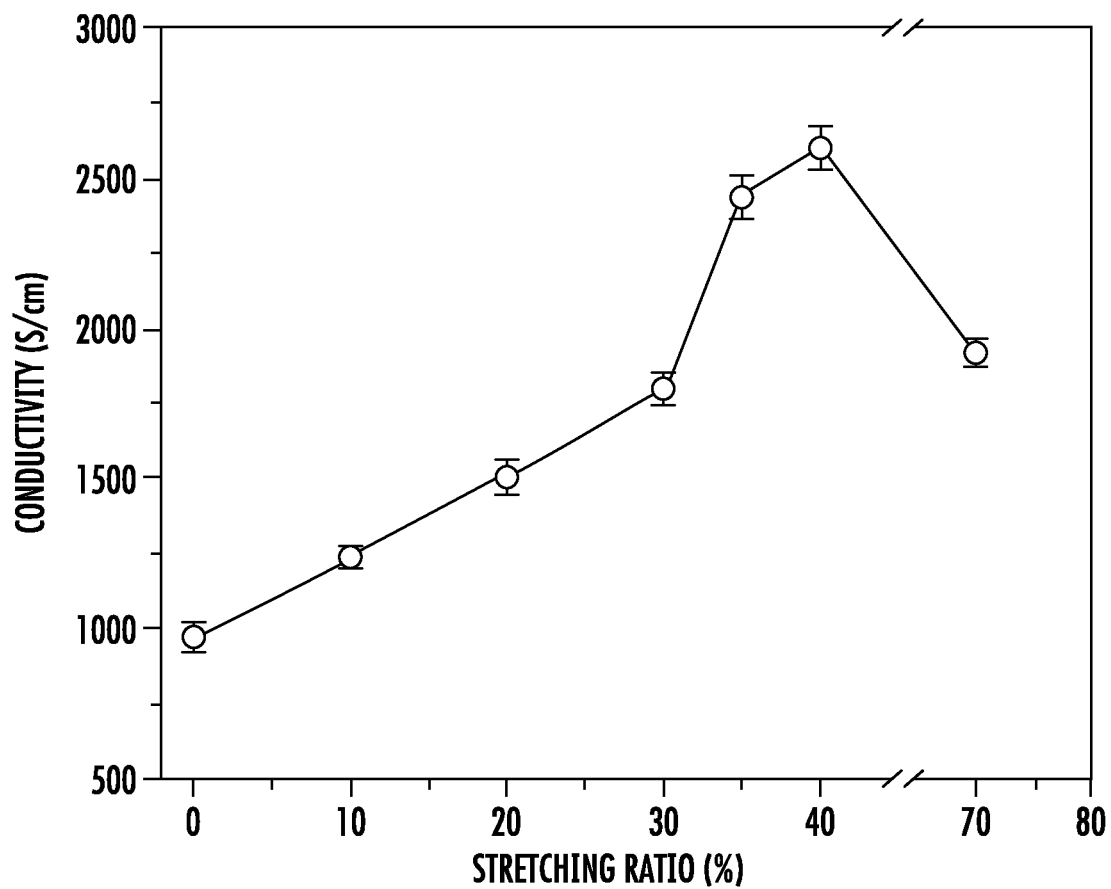
FIG. 1 depicts the relationship between stretching ratio and room temperature electrical conductivity for one embodiment of a mechanically stretched CNT sheet.

Provided herein are methods of making composite materials that may be stable, highly conductive, and/or lightweight, especially compared to dense materials made of metals, such as copper. The methods provided herein may be facile and/or scalable because the methods may permit the production of a composite material having large dimensions. Sheets and/or ribbons of the composite materials, for example, may be made having at least one dimension of 10 m or more. The composite materials also may have relatively long service lives in various applications, due, at least in part, to their stability in air.

The methods provided herein generally may comprise stretching a carbon nanoscale fiber network that includes a plurality of randomly oriented carbon nanoscale fibers, contacting the carbon nanoscale fiber network with a dopant, and disposing a capping layer on the carbon nanoscale fiber network. It was surprisingly discovered that the stretching and the doping of a carbon nanoscale fiber network may have a synergistic effect regarding electrical conductivity. Typically, stretching a carbon nanoscale fiber network of randomly oriented fibers improves the conductivity of the network by about 2× to about 3× (for example, an initial conductivity of 1,000 S/cm may be increased to about 2,000 S/cm to about 3,000 S/cm). Similarly, associating a dopant with a carbon nanoscale fiber network that includes randomly oriented fibers typically improves the conductivity of the network by about 2.5× to about 3.5 (for example, an initial conductivity of 1,000 S/cm may be increased to about 2,500 S/cm to about 3,500 S/cm). Unexpectedly, however, the electrical conductivity of a carbon nanoscale fiber network of randomly oriented carbon nanoscale fibers may be improved at least 10× or at least 12× when the network is stretched and associated with a dopant according to the methods described herein. In some embodiments, the electrical conductivity may be improved by about 10× to about 15×, about 11× to about 13×, or about 12× to about 13× by the methods described herein. For example, an initial conductivity of 1,000 S/cm may be increased to about 10,000 S/cm to about 15,000 S/cm when a carbon nanoscale fiber network that includes randomly oriented carbon nanoscale fibers is subjected to the stretching and doping steps described herein.

The unexpected increases in electrical conductivity also are minimally impacted as the dimensions of the carbon nanoscale fiber network increase. Typically, as the size of a network increases, the electrical conductivity decreases. Embodiments of the methods described herein, however, may surprisingly permit the processes to be scaled up with minimal impact on the electrical conductivity of the resulting composite material.

Alignment of Carbon Nanoscale Fibers

In embodiments, the methods of making a composite material comprise stretching a carbon nanoscale fiber network comprising a plurality of randomly oriented carbon nanoscale fibers. The stretching may align at least a portion of the plurality of randomly oriented carbon nanoscale fibers. A plurality of carbon nanoscale fibers is "randomly oriented" when no more than 20% of the carbon nanoscale fibers, by weight, are substantially aligned, i.e., within ±5° of parallel to a particular axis. A portion of the carbon nanoscale fibers are "aligned" when at least 20% of the carbon nanoscale fibers, by weight, are substantially aligned, i.e., within ±5° of parallel to a particular axis. In some embodiments, the stretching steps described herein may "align" at least 30%, at least 40%, at least 50%, at least 60%, at least 70%, at least 80%, or at least 90%, by weight, of the plurality of carbon nanoscale fibers. In other words, at least 30%, at least 40%, at least 50%, at least 60%, at least 70%, at least 80%, or at least 90%, by weight, of the plurality of carbon nanoscale fibers may be arranged within ±5° of parallel to a particular axis as a result of the stretching steps described herein.

The stretching of the carbon nanoscale fiber network generally includes applying a stretching force to the network. The stretching force may be applied along a single axis. For example, if the carbon nanoscale fiber network is in the form of a ribbon, a stretching force may be applied to the ends of the ribbon, or, alternatively, along the entire sides of the ribbon. The stretching force generally may be sufficient to achieve any of the stretch ratios described herein.

The stretching force may be applied mechanically. The mechanical stretching may be achieved by applying a stretching force to the carbon nanoscale fiber network with any means known in the art, including one or more rollers, such as pinch rollers.

The stretching of the carbon nanoscale fiber networks may impart the carbon nanoscale fiber networks with a stretch ratio of about 10% to about 70%. The "stretch ratio" is determined by the following equation:

$(D2-D1)/D1*100 =$ Stretch Ratio wherein D1 is the original dimension of the network along the axis to which the stretching force is applied, and D2 is the new dimension of the network, after stretching, along the same axis. For example, if the network is in the shape of a ribbon 10 m long and 0.5 m wide, and a stretching force applied to the ends of the ribbon increases the length of the ribbon to 12 m, then the stretching ratio is 20%. In one embodiment, the stretch ratio is about 10% to about 70%. In another embodiment, the stretch ratio is about 10% to about 60%. In a further embodiment, the stretch ratio is about 10% to about 50%. In a still further embodiment, the stretch ratio is about 20% to about 50%. In some embodiments, the stretch ratio is about 25% to about 45%. In a particular embodiment, the stretch ratio is about 35%.

The stretching steps may increase the bulk density of the carbon nanoscale fiber networks. In embodiments, the stretching steps described herein may increase the bulk density of the carbon nanoscale fiber networks by about 20% to about 50%, about 30% to about 40%, or about 35%. In other words, a carbon nanoscale fiber network having an original bulk density of about 0.6 g/cm may have a bulk density of about 0.72 g/cm (20% greater) to about 0.9 g/cm (50% greater) after stretching.

Not wishing to be bound by any particular theory, it is believed that improving the alignment of the carbon nanoscale fibers can enhance [1] the contacts between the individual fibers and/or bundles of fibers, [2] the density of the packing structure of the networks, and/or [3] the formation and improvement of graphitic crystal-like microstructures, which may result in better connectivity and/or long-range order, thereby improving the electrical conductivity. Moreover, the alignment of the fibers may enhance electrical conductivity due to a diminished number of electrical junctions and/or a geometric decrease in the junctions' pathways.

Carbon Nanoscale Fibers and Networks

As used herein, the phrase "carbon nanoscale fiber" refers to a thin, greatly elongated solid material comprising carbon, typically having a cross-section or diameter of less than 500 nm. The carbon nanoscale fibers may have an aspect ratio of about 100:1 to about 100,000:1. In one embodiment, the carbon nanoscale fibers have a length of about 0.5 mm to about 1.2 mm, and a diameter of about 3 nm to about 10 nm. In a particular embodiment, the carbon nanoscale fibers have a length of about 1.0 mm, and a diameter of about 3 nm to about 8 nm.

The carbon nanoscale fibers may include CNTs. In embodiments, the carbon nanoscale fibers include single-wall carbon nanotubes (SWNTs), multi-wall carbon nanotubes (MWNTs), carbon nanofibers, and combinations thereof. In some embodiments, the CNTs are SWNTs. In particular embodiments, the CNTs are MWNTs. In still further embodiments, the CNTs are a mixture of SWNTs and MWNTs. In additional embodiments, the CNTs are a mixture of SWNTs, MWNTs, and carbon nanofibers.

As used herein, the phrase "carbon nanotubes" and the abbreviation "CNTs" generally refer to tubular graphite, which may be capped with fullerene structures. The CNTs may be a synthetic material having a wide molecular weight range that depends substantially on the diameter and length of the CNTs. CNTs are commercially available from companies such as General Nano, LLC (Cincinnati, OH, USA) and Nanocomp Technologies Inc. (NH, USA), or can be made using techniques known in the art. The CNTs can be pristine, in which the carbon fullerene tubes have fullerene end caps, or the CNTs can be non-pristine, for example, where the pristine CNTs have been chemically or mechanically altered (e.g., chopped) and then optionally functionalized to convert dangling carbon atoms to different functional groups, such as carbonyl or other oxygen containing groups. The sidewalls of the CNTs also may be functionalized to include one or more functional groups. The CNTs, in embodiments, also include one or more other nanomaterials, such as graphene, metal nanoparticles, or a combination thereof. In embodiments, the CNTs are pristine MWNTs. In other embodiments, the CNTs are non-pristine MWNTs. In some embodiments, the CNTs include a mixture of pristine MWNTs and pristine SWNTs. In still further embodiments, the CNTs include a mixture of pristine MWNTs and non-pristine SWNTs, or vice versa. In one embodiment, the CNTs are pristine SWNTs. In another embodiment, the CNTs are non-pristine SWNTs. In each of the foregoing embodiments, the sidewalls of at least a portion of the SWNTs, MWNTs, or a combination thereof may be functionalized. As used herein, the phrase "carbon nanofibers" refers to filamentous fibers that resemble whiskers of multiple graphite sheets or MWNTs.

The phrase "carbon nanoscale fiber network", as used herein, refers to a macroscopic aggregate of carbon nanoscale fibers. The carbon nanoscale fiber networks herein may be in the form of a sheet (i.e., film) or strip (i.e., ribbon). The carbon nanoscale fiber networks generally may have any dimensions suited to a particular application. For example, the carbon nanoscale fiber networks may have a length of about 10 cm to about 10 m, a width of about 7 mm to about 10 mm, and a thickness of about 10 µm to about 50 µm. Other dimensions are envisioned, including lengths and/or widths that exceed 10 m. Carbon nanoscale fiber networks are available commercially, or may be formed by techniques known in the art, such as dispersing carbon nanoscale fibers in a non-solvent and filtering and/or evaporating the non-solvent.

In one embodiment, the carbon nanoscale fiber network comprises CNTs, and the carbon nanoscale fiber network is a buckypaper. Buckypapers may be made through the dispersion of CNTs in suspension followed by a filtration or evaporation process, or stretching or pushing synthesized nanotube "forests" to form sheets or strips.

The carbon nanoscale fiber networks herein may be rolled and/or pressed according to techniques known in the art. A rolling and/or pressing technique may be performed at any time during, before, and/or after any of the steps of the methods described herein are performed. For example, a rolling and/or pressing technique may be performed before, after, or both before and after the stretching of the carbon nanoscale fiber networks. The pressing may be a hot-pressing technique. In one embodiment, the carbon nanoscale fibers comprise CNTs, and the carbon nanoscale fiber network is stretched as described herein, and then subjected to hot-pressing.

Not wishing to be bound by any particular theory, it is believed that the stretching steps described herein or the stretching steps described herein in combination with at least one of rolling and pressing may achieve relatively dense packing and improved alignment of the carbon nanoscale fibers of the carbon nanoscale fiber networks, which may result in improved conductivity.

Functionalization of the carbon nanoscale fibers and/or the carbon nanoscale fiber networks may be performed at any time during, before, and/or after any of the steps of the methods described herein are performed. Surface functionalization may be achieved by subjecting the carbon nanoscale fibers and/or carbon nanoscale fiber networks to microwaves, plasma, electron beam, chemical functionalization, or a combination thereof. Not wishing to be bound by any particular theory, it is believed that the surface functionalization techniques may improve at least one of the mechanical and electrical properties of the carbon nanoscale fibers and/or carbon nanoscale fiber networks.

Doping Processes and Dopants

The methods provided herein also may comprise contacting a carbon nanoscale fiber network with a dopant. The contacting may occur under conditions that permit the dopant to (i) adsorb to one or more surfaces of the carbon nanoscale fiber network, (ii) penetrate the carbon nanoscale fiber network, or (iii) a combination thereof. In one embodiment, the dopant is adsorbed to one or more surfaces of the carbon nanoscale fiber network. In another embodiment, the dopant penetrates the carbon nanoscale fiber network, and, therefore, is disposed in the internal structure of the carbon nanoscale fiber network. In a further embodiment, the dopant is adsorbed to one or more surfaces of the carbon nanoscale fiber network, and disposed in the internal structure of the carbon nanoscale fiber network.

Therefore, after the contacting of the carbon nanoscale fiber network with the dopant, the dopant may be adsorbed to one or both sides of the carbon nanoscale fiber network when, for example, the carbon nanoscale fiber network is in the shape of a sheet or ribbon. The phrase "one or both sides" refers to the surfaces of the sheet or ribbon that are opposite each other and have the largest surface areas of all the surfaces of the sheet or ribbon, respectively. In addition or alternative to "one or both sides", the dopant may be adsorbed to one or more of the surfaces of the edges of the ribbon or sheet. The "surfaces of the edges" of the ribbon or sheet include those portions having one dimension defined by the thickness of the ribbon or sheet, respectively. The amount of dopant per surface area unit (e.g., $cm^2$, $mm^2$, etc.) of the one or more surfaces of the carbon nanoscale fiber network may be substantially equal (±5%) or unequal.

The dopant also may penetrate the carbon nanoscale fiber network, and, therefore, be disposed in the internal structure of the carbon nanoscale fiber network. The "internal structure" of a carbon nanoscale fiber network includes the network formed by the carbon nanoscale fibers and portions thereof that cannot be contacted by touching an external surface of the carbon nanoscale fiber network. For example if three sheets of a carbon nanoscale fiber network were stacked, then the "internal structure" of the middle sheet is formed by the carbon nanoscale fibers and portions thereof that do not contact the first and third sheets. The dopant that penetrates the carbon nanoscale fiber network may be adsorbed to carbon nanoscale fibers having at least a portion that exists beneath a surface of the carbon nanoscale fiber network, and/or the disposed in the interstitial space between the carbon nanoscale fibers having at least a portion that exists beneath a surface of the carbon nanoscale fiber network. The amount of dopant per volume (e.g., $mm^3$, $\mu m^3$, etc.) in the internal structure of the carbon nanoscale fiber networks may be substantially equal (±5%) or unequal.

Generally, the dopant may be any material having the potential to improve one or more properties of the carbon nanoscale fiber networks. The one or more properties improved by the dopant may include, but is not limited to, electrical conductivity. In embodiments, the dopant comprises an oxidant. Not wishing to be bound by any particular theory, it is believed that these oxidants may act as electron acceptors, thereby improving electron transfer between the CNTs and the dopant, which can increase electrical conductivity. Non-limiting examples of oxidants include $I_2$, ICl, $SOCl_2$, $HNO_3$, HCl, or a combination thereof. In one embodiment, the dopant comprises $I_2$. Not wishing to be bound by any particular theory, it is believed that iodine may achieve metallization of CNT sheets by gas phase iodination, and, as a result, improve the electrical properties of the CNTs after doping. In another embodiment, the dopant comprises ICl. In yet another embodiment, the dopant comprises $SOCl_2$. In a further embodiment, the dopant comprises $I_2$ and $SOCl_2$.

In embodiments, the contacting of the carbon nanoscale fiber network with the dopant occurs at a temperature sufficient to sublimate the dopant. In other words, at least a portion of the contacting process is performed at a temperature high enough to cause the dopant to sublime. The dopant vapor then may be allowed to contact the carbon nanoscale fiber network. The carbon nanoscale fiber network may be allowed to contact a liquid that is or includes the dopant, and/or a vapor that is or includes the dopant.

The contacting of the carbon nanoscale fiber network with a dopant generally is performed before a capping layer is applied to the carbon nanoscale fiber network according to the methods described herein. The contacting of the carbon nanoscale fiber network with a dopant, however, may be performed before or after the other steps described herein, including the stretching, rolling, pressing, etc. In one embodiment, a carbon nanoscale fiber network is stretched prior to, but not necessarily immediately prior to, being contacted with a dopant. In another embodiment, a carbon nanoscale fiber network is stretched after, but not necessarily immediately after, being contacted with a dopant. Not wishing to be bound by any particular theory, it is believed that the stretching of a previously doped carbon nanoscale fiber network may cause, in some instances, at least a portion of the dopant to desorb during and/or after stretching. In other instances, the stretching of a previously doped carbon nanoscale fiber network may prevent a dopant from separating from a carbon nanoscale fiber network, or reduce the likelihood of a dopant separating from a carbon nanoscale fiber network.

It was surprisingly discovered that an amount of dopant sufficient to improve one or more properties of the carbon nanoscale fiber networks may penetrate the previously stretched carbon nanoscale fiber networks. As a result of embodiments of the stretching steps described herein, the carbon nanoscale fiber networks typically experience an enhancement of [1] density, [2] the number of contacts between the individual fibers and/or bundles of fibers, and/or [3] the formation and improvement of graphitic crystal-like microstructures, each of which can restrict the ability of a material, such as a dopant, to penetrate the carbon nanoscale fiber networks.

After the contacting of a carbon nanoscale fiber network with a dopant, the dopant may be present in an amount sufficient to improve one or more properties of the carbon nanoscale fiber network. The one or more properties may include electrical conductivity. In embodiments, the dopant is present in a carbon nanoscale fiber network in an amount of about 10% to about 40% by weight, based on the total weight of the plurality of carbon nanoscale fibers and dopant. In further embodiments, the dopant is present in a carbon nanoscale fiber network in an amount of about 10% to about 35% by weight, based on the total weight of the plurality of carbon nanoscale fibers and dopant. In additional embodiments, the dopant is present in a carbon nanoscale fiber network in an amount of about 10% to about 25% by weight, based on the total weight of the plurality of carbon nanoscale fibers and dopant. In some embodiments, the dopant is present in a carbon nanoscale fiber network in an amount of about 15% to about 25% by weight, based on the total weight of the plurality of carbon nanoscale fibers and dopant.

The contacting of the carbon nanoscale fiber network with a dopant may be conducted for any time sufficient to enhance one or more properties of the carbon nanoscale fiber network and/or achieve a desired amount or concentration of dopant adsorbed to and/or penetrated into the carbon nanoscale fiber network. When the one or more properties is electrical conductivity, the carbon nanoscale fiber network may be contacted with a dopant for a time that permits the electrical conductivities of the carbon nanoscale fiber networks to reach steady-state. In embodiments, a carbon nanoscale fiber network is contacted with a dopant for about 1 hour to about 24 hours. In other embodiments, the carbon nanoscale fiber network is contacted with a dopant for about 2 to about 4 hours. In one embodiment, the dopant is iodine, and the carbon nanoscale fiber network is contacted with iodine for about 3 hours at about 70° C.

Capping Layer

The methods provided herein may comprise disposing a capping layer to at least a portion of a carbon nanoscale fiber network. In one embodiment, the capping layer is disposed on at least a surface of a carbon nanoscale fiber network. The surface onto which the capping layer is disposed may include one, all, or any portion of the external surfaces of a carbon nanoscale fiber network. The capping layer may be disposed substantially evenly on at least a surface of a carbon nanoscale fiber network or unevenly on at least a surface of a carbon nanoscale fiber network. Alternatively, the capping layer may be disposed substantially evenly on a first surface of a carbon nanoscale fiber network, and unevenly on a second surface of a carbon nanoscale fiber network.

For example, when the carbon nanoscale fiber network is a sheet or ribbon, the capping layer may be disposed substantially evenly on both sides of the sheet or ribbon. As a further example, the capping layer may be disposed unevenly on both sides of the sheet or ribbon. As yet another example, the capping layer may be disposed substantially evenly on one side of the sheet or ribbon, and unevenly on the other side of the sheet or ribbon. In an additional example, the capping layer may be disposed substantially evenly or unevenly on one side of the sheet or ribbon, and the other side of the sheet or ribbon may be substantially free of the capping layer.

The capping layer generally may be any material that [1] does not substantially impact the electrical conductivity of a doped and stretched carbon nanoscale fiber network, [2] enhances one or more properties of the carbon nanoscale fiber network, [3] enhances the stability, such as the air stability, of the carbon nanoscale fiber network and/or dopant, [4] reduces or eliminates the likelihood of dopant desorption, or [5] a combination thereof.

In embodiments, the capping layer comprises a conductive polymer. The conductive polymer may be poly(3,4-ehtylenedioxythiphene)-poly(styrenesulfonate) (PEDOT:PSS).

In embodiments, the capping layer comprises an insulating polymer. The insulating polymer may provide surface insulation.

The capping layer may be disposed on the carbon nanoscale fiber network using any techniques known in the art. In embodiments, the capping layer is disposed on the carbon nanoscale fiber network by dip coating. For example, disposing the capping layer on a carbon nanoscale fiber network may comprise submerging at least a portion of the carbon nanoscale fiber network in a liquid comprising a capping layer, such as a conductive polymer. The carbon nanoscale fiber network may be submerged once, repeatedly, or a combination thereof for a period of time sufficient to dispose a desirable amount of the capping layer on the carbon nanoscale fiber network or a portion thereof. In one embodiment, a carbon nanoscale fiber network is submerged in a mixture of water and PEDOT:PSS. After the carbon nanoscale fiber network is dipped coated, the liquid may be removed by drying, which may be performed under vacuum and/or at a temperature greater than room temperature.

Composite Materials

Also provided herein are composite materials. In embodiments, the composite materials comprise a carbon nanoscale fiber network comprising a plurality of substantially aligned carbon nanoscale fibers; a dopant adsorbed to one or more surfaces of the carbon nanotube fiber network, dispersed within the carbon nanotube fiber network, or a combination thereof; and a capping layer disposed on at least one surface of the carbon nanoscale fiber network.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers.

The electrical conductivity of the composite material may be about 5,000 S/cm to about 50,000 S/cm, about 5,000 S/cm to about 40,000 S/cm, about 10,000 S/cm to about 40,000 S/cm, about 5,000 S/cm to about 30,000 S/cm, about 10,000 S/cm to about 30,000 S/cm, about 5,000 S/cm to about 25,000 S/cm, about 10,000 S/cm to about 25,000 S/cm, about 5,000 S/cm to about 20,000 S/cm, about 10,000 S/cm to about 20,000 S/cm, about 5,000 S/cm to about 15,000 S/cm, or about 10,000 S/cm to about 15,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 5,000 S/cm to about 50,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 5,000 S/cm to about 40,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 5,000 S/cm to about 30,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 5,000 S/cm to about 25,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 5,000 S/cm to about 20,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 5,000 S/cm to about 15,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 10,000 S/cm to about 50,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 10,000 S/cm to about 40,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 10,000 S/cm to about 30,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 10,000 S/cm to about 25,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 10,000 S/cm to about 20,000 S/cm.

The dopant may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers, and the electrical conductivity of the composite material may be about 10,000 S/cm to about 15,000 S/cm.

The carbon nanoscale fibers of the carbon nanoscale fiber network, which may be in the form of a sheet or ribbon, may include single-wall carbon nanotubes, multi-wall carbon nanotubes, carbon nanofibers, or a combination thereof; the dopant, such as iodine, may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers; the electrical conductivity of the composite material may be about 5,000 S/cm to about 50,000 S/cm; and the capping ligand may include a conductive polymer, such as PEDOT:PSS.

The carbon nanoscale fibers of the carbon nanoscale fiber network, which may be in the form of a sheet or ribbon, may include single-wall carbon nanotubes, multi-wall carbon nanotubes, carbon nanofibers, or a combination thereof; the dopant, such as iodine, may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers; the electrical conductivity of the composite material may be about 5,000 S/cm to about 40,000 S/cm; and the capping ligand may include a conductive polymer, such as PEDOT:PSS.

The carbon nanoscale fibers of the carbon nanoscale fiber network, which may be in the form of a sheet or ribbon, may include single-wall carbon nanotubes, multi-wall carbon nanotubes, carbon nanofibers, or a combination thereof; the dopant, such as iodine, may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers; the electrical conductivity of the composite material may be about 5,000 S/cm to about 30,000 S/cm; and the capping ligand may include a conductive polymer, such as PEDOT:PSS.

The carbon nanoscale fibers of the carbon nanoscale fiber network, which may be in the form of a sheet or ribbon, may include single-wall carbon nanotubes, multi-wall carbon nanotubes, carbon nanofibers, or a combination thereof; the dopant, such as iodine, may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers; the electrical conductivity of the composite material may be about 5,000 S/cm to about 25,000 S/cm; and the capping ligand may include a conductive polymer, such as PEDOT:PSS.

The carbon nanoscale fibers of the carbon nanoscale fiber network, which may be in the form of a sheet or ribbon, may include single-wall carbon nanotubes, multi-wall carbon nanotubes, carbon nanofibers, or a combination thereof; the dopant, such as iodine, may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers; the electrical conductivity of the composite material may be about 5,000 S/cm to about 20,000 S/cm; and the capping ligand may include a conductive polymer, such as PEDOT:PSS.

The carbon nanoscale fibers of the carbon nanoscale fiber network, which may be in the form of a sheet or ribbon, may include single-wall carbon nanotubes, multi-wall carbon nanotubes, carbon nanofibers, or a combination thereof; the dopant, such as iodine, may be present in the composite material in an amount of about 1% to about 25% by weight, about 5% to about 25% by weight, about 10% to about 25% by weight, about 10% to about 20% by weight or about 15% to about 20% by weight, based on the combined weight of the dopant and the plurality of substantially aligned carbon nanoscale fibers; the electrical conductivity of the composite material may be about 5,000 S/cm to about 15,000 S/cm; and the capping ligand may include a conductive polymer, such as PEDOT:PSS.

Applications

It is believed that the composite materials described herein can be used as or in cables for applications such as power transmission, electromagnetic interference (EMI) shielding in electronic devices, and lightning protection. Therefore, the relevant applications include, but are not limited to, CNT cables for signal or power lines, EMI shielding structures and composite materials for aerospace, automobile, and electronics industries.

In the descriptions provided herein, the terms "includes," "is," "containing," "having," and "comprises" are used in an open-ended fashion, and thus should be interpreted to mean "including, but not limited to." When methods and composite materials are claimed or described in terms of "comprising" various components or steps, the composite materials and methods can also "consist essentially of" or "consist of" the various components or steps, unless stated otherwise.

The terms "a," "an," and "the" are intended to include plural alternatives, e.g., at least one. For instance, the disclosure of "a conductive polymer," "a dopant," "a carbon nanoscale fiber network", and the like, is meant to encompass one, or mixtures or combinations of more than one conductive polymer, dopant, carbon nanoscale fiber network, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that the dopant is present in the carbon nanoscale fiber network in an amount of about 10% to about 25% by weight. This range should be interpreted as encompassing weight percentages in a range from about 10% to about 25%, and further encompasses "about" each of 10%, 11%, 12%, 13%, 14%, 15% 16%, 17%, 18%, 19%, 20%, 21%, 22%, 23%, 24% and 25%, including any ranges and sub-ranges between any of these values.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Mechanical Stretching of CNT Sheets

Aligned CNT sheets were prepared by subjecting CNT sheets of randomly oriented CNTs to continuous mechanical stretching. Carbon nanotube sheets of randomly oriented CNTs were purchased from Nanocomp Technologies Inc. (NH, USA).

In this example, the stretching ratio was about 35%, which was believed to ensure the structural integrity and/or promising electrical conductivity. This conclusion was based on a study of the different stretch ratios and the resulting structure-property relationships. As the stretching ratio increased from 0% to 70%, the electrical conductivity gradually increased from about 1,000 S/cm to about 2,500 S/cm for the samples having a stretching ratio of about 35%, and then decreased to about 2,000 S/cm for the samples having a stretch ratio of 70%, as shown at FIG. 1.

It was believed that the conductivity (a) increased slowly at the initial stretching stage due to the fact that the completely randomly oriented CNTs were becoming relatively ordered. Then, it was believed that the conductivity increased more quickly as the stretching ratios exceeded 20% because of the one or more effects of alignment on the conductivity.

Not wishing to be bound by any particular theory, it was believed that the electrical conductivity was reduced as the stretching ratio increased from 35% to 70% due to the additional non-conductive residues left by the stretching process during the production of the samples having a stretch ratio greater than 40%. Stretch ratios greater than 70% are possible, but avoided in this example in order to ensure that the structural integrity of the CNT sheets was not compromised.

In addition to the increase in conductivity, the alignment of the CNT sheet also resulted in an increase of bulk density. The bulk density of the CNT sheet prior to alignment was 0.67 g/cm. After the stretching of this example, the bulk density of the CNT sheet having a stretch ratio of 35% was 0.91 g/cm. It was believed that the change in bulk density demonstrated a relatively more compact structure, denser contact between CNTs, and/or decreased tunneling barriers (such as air gap) between conducting regions.

The 35% aligned CNT sheets made according to the method of this example had widths of about 7 mm, and lengths of up to 10 m.

Example 2—Doping of Aligned CNT Sheets

The 35% aligned CNT sheets of Example 1 were doped with iodine (Sigma-Aldrich, Inc. St. Louis, MO) by placing the 35% aligned CNT sheets in a sealed vial having a fixed iodine concentration (0.2 mol/L) at 343 K (70° C.). It was believed that the solid iodine sublimated to a vapor, and formed small active molecules upon heating. Although iodine is capable of sublimating at room temperature, it was believed that the increased temperature of this example increased the velocity of the iodine molecules. The greater velocity was believed to increase the likelihood that the ionic molecules would penetrate the CNT sheets, thereby improving the efficiency of the doping process.

The 35% aligned CNT sheets remained in the sealed vial for times ranging from 1 hour to 24 hours, and the electrical properties of the 35% aligned CNT sheets were evaluated after each doping time. It was determined that 3 hours was optimal for the 35% aligned CNT sheets of this example, because it was determined that the electrical conductivities of the 35% aligned CNT sheets reached steady-state at 3 hours of doping.

Due to the mild doping conditions, it was believed that the structural integrity of the CNT sheets was preserved.

Figure 2:
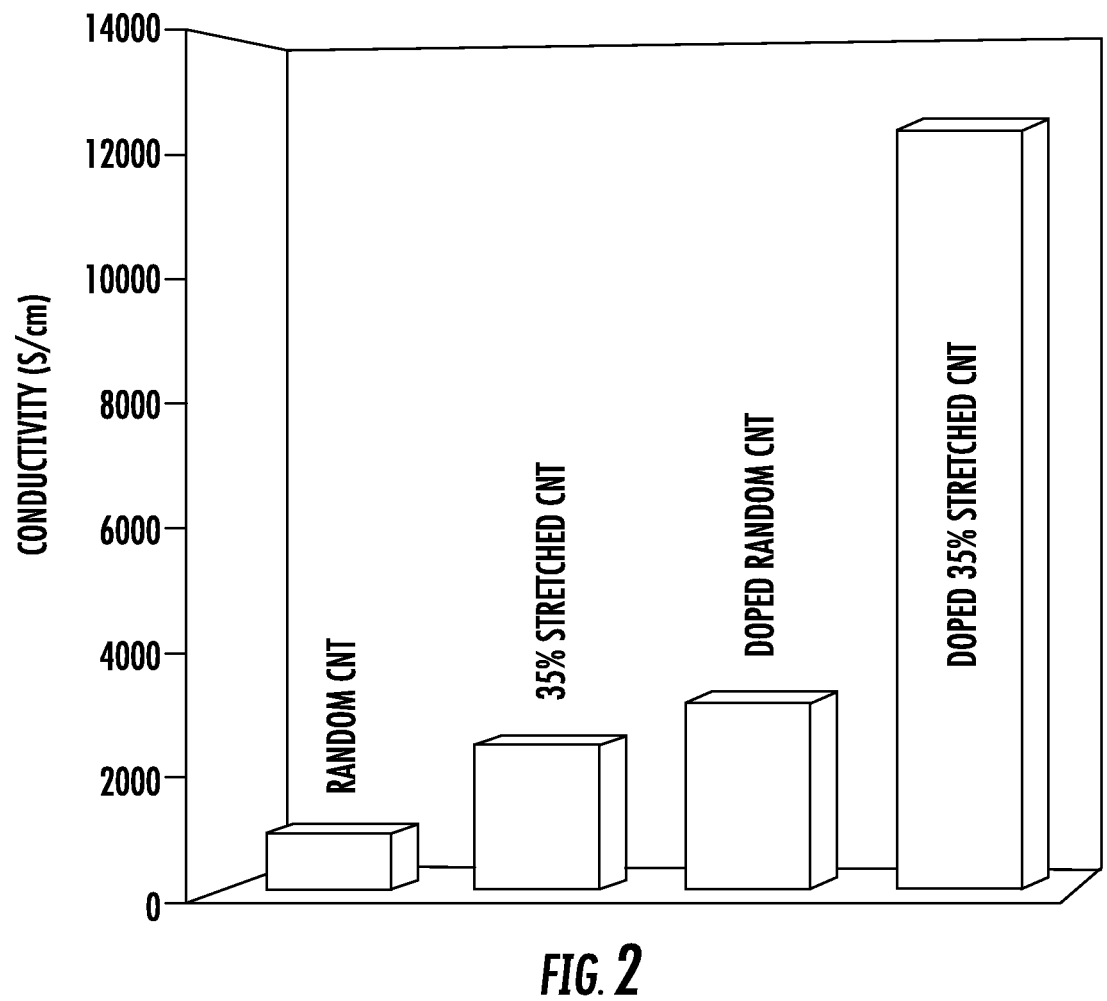
FIG. 2 depicts the conductivity (S/cm) of one embodiment of a randomly oriented CNT sheet and one embodiment of an aligned CNT sheet before and after being subjected to one embodiment of an iodine doping process.

The iodine doping process of this example increased the electrical conductivity of the 35% stretched CNT sheets from about 2,400 S/cm to about 12,000 S/cm, as shown at FIG. 2. As shown at FIG. 2, the doping process of this example impacted the aligned CNT sheets more than the randomly oriented CNT sheets.

The electrical conductivity of different sizes or dimensions of CNT networks also was measured. Typically, the larger the dimensions of the samples, the lower the electrical performance. After the doping of this example, however, when the width of CNT sheets varied from 1 mm to 7 mm, the conductivity showed only a slight fluctuation at about 10,000 S/cm. Therefore, it was believed that mechanical stretching combined with iodine doping was a promising way to product highly conductive CNT sheets with variable large sizes and good conductivity consistency. Therefore, it was surprisingly discovered that the materials of the examples and embodiments of those described herein may be scaled-up to significantly larger dimensions without substantially reducing the electrical performance of the materials. This was believed to be due, at least in part, to the fact that the macroscopic CNT sheets of the examples were highly aligned along the stretching direction and, therefore, had a densely packed structure metallized by iodine doping, which likely reduced tube-to-tube contact resistance and/or increased carrier density, thereby leading to a higher electrical conductivity.

Example 3—Capping Layer

A capping layer of PEDOT:PSS was dip-coated on the surface of the doped 35% aligned CNT sheets of Example 2, and dried at room temperature overnight. The PEDOT:PSS in water (Sigma-Aldrich Inc., St. Louis, MO) was used as received without any dilution.

It was believed that the capping layer only covered the surface of the doped 35% aligned CNT sheets, and did not penetrate inside the doped 35% aligned CNT sheets, likely due to the small nanosized pores and/or hydrophobicity of the doped 35% aligned CNT sheets.

In view of the low conductivity of PEDOT:PSS (approximately 1 S/cm), the high conductivity of the products of this example was believed to be at least partially ascribed to the doped 35% aligned CNT networks.

Figure 3:
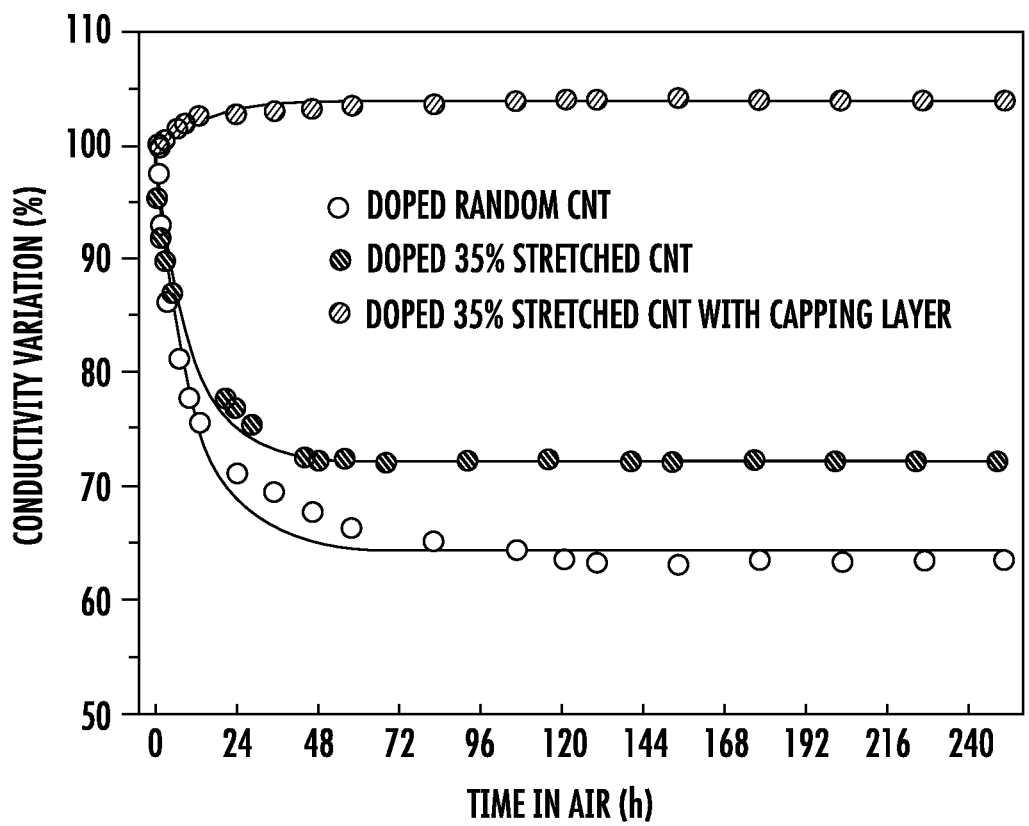
FIG. 3 depicts the stability of the conductivity of several doped embodiments of CNT sheets.

FIG. 3 depicts the unstable nature of iodine doped randomly oriented and 35% stretched CNT sheets, and the effects of the coating layer of PEDOT:PSS on the stability of electrical performance of 35% stretched CNT sheets after doping. The doped randomly oriented and 35% stretched CNT sheets without any coating layer both showed an electrical conductivity decrease of 37% and 28% after 4 days, respectively, which was believed to be due to the unstable nature of iodine and its possible desorption. After the initial 4 days, the conductivity became stable with small fluctuations afterwards.

After coating the PEDOT:PSS layer on the doped 35% stretched CNT sheets, the electrical conductivity slightly increased and then stabilized at around 104% of the conductivity of the uncoated control samples. The coated doped random sample behaved in a similar way. There was no conductivity change for testing conducted in open air and room temperature after one week for doped 35% stretched CNT sheets with an additional layer of PEDOT:PSS, which was believed to demonstrate its protective shielding effects on avoiding the decrease of electrical conductivity.

Example 4—Characterization

The CNT networks (Example 1), 35% stretched CNT networks (Example 1), doped CNT networks (Example 2), and doped 35% aligned CNT networks having a capping layer of PEDOT:PSS (Example 4) were subjected to multiple analyses.

Tensile property tests were conducted using dynamic mechanical analysis (DMA) machine (Q800 TA Instrument, Inc.) at room temperature under film tension mode with a preload force of 0.01 N and force ramp of 2 N/min. The sample dimension was approximately 10 mm in gauge length, 1 mm in width, and 28.5 µm in thickness.

Modulus was confirmed by testing samples with a large dimension of 10 mm in gauge length, 5 mm in width, and 28.5 µm in thickness using a tensile machine (AGS-J, Shiadzu Scientific, Inc., Japan).

Figure 4:
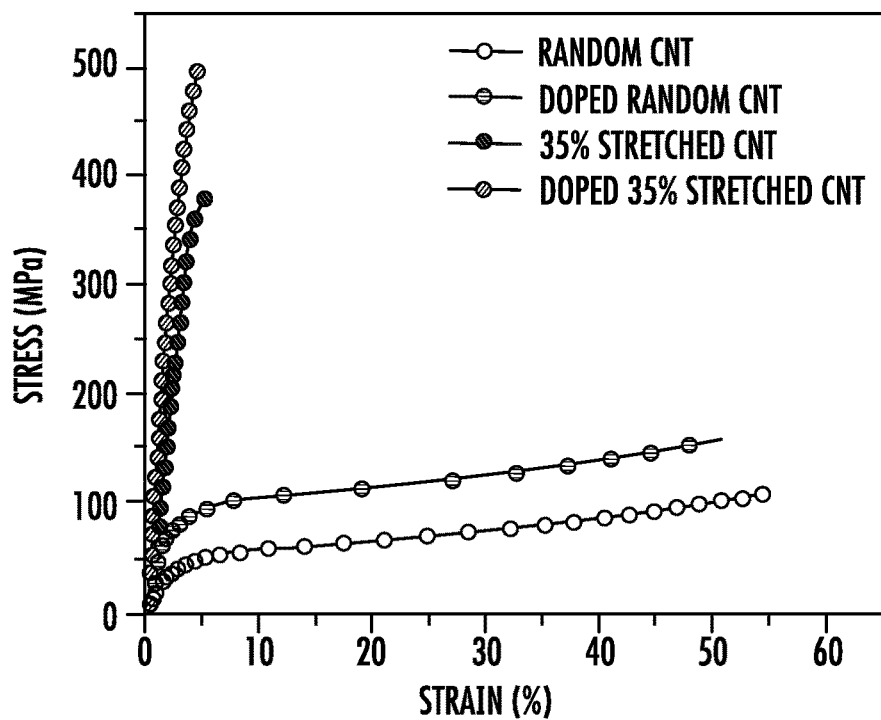
FIG. 4 depicts stress versus strain curves for several doped and undoped embodiments of CNT sheets, including embodiments that include randomly oriented CNTs and at least partially aligned CNTs.

Since it was believed that better contact and/or alignment among individual CNTs of the CNT sheets occurred after stretching, an improved mechanical performance was expected. FIG. 4 depicts the stress-strain curves of the random and 35% stretched samples of the examples before and after the doping process of Example 2 was performed.

Figure 5:
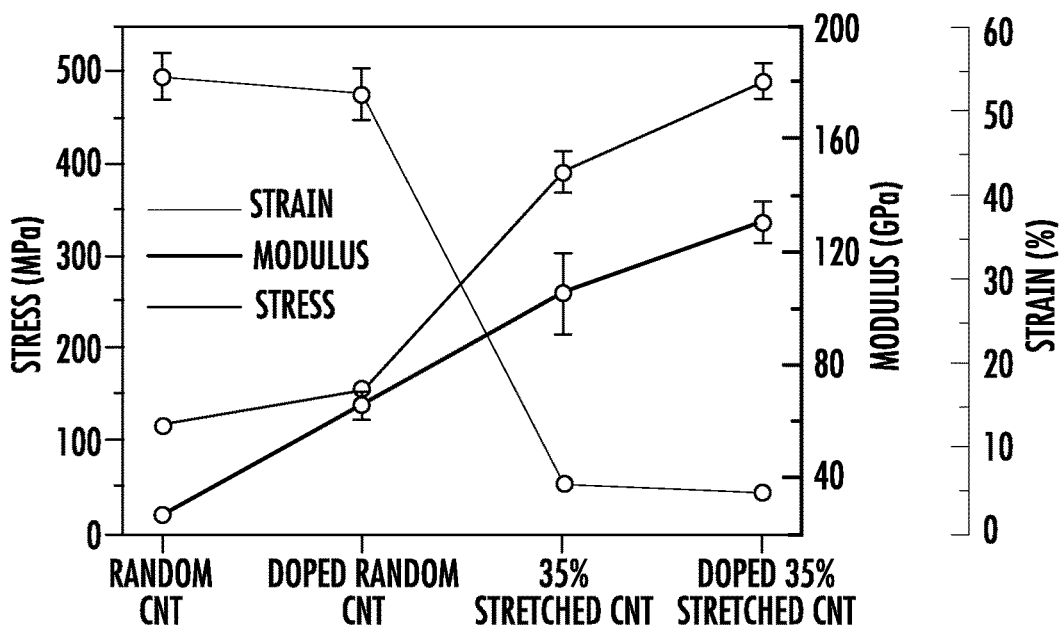
FIG. 5 depicts the average values of tensile stress, modulus, and failure strain for several doped and undoped embodiments of CNT sheets, including embodiments that include randomly oriented CNTs and at least partially aligned CNTs.

The ultimate tensile stretch (UTS), Young's modulus, and failure strain (along the nanotube alignment direction for stretched samples) were plotted at FIG. 5. After mechanical stretching, the failure strain for the 35% stretched sample significantly decreased to 5.6%, from the 54% of the undoped randomly oriented sample. The UTS dramatically increased from 116 MPa to 391 MPa for the random and 35% stretched CNT sheets, respectively. For the randomly oriented sample, the individual CNTs were loosely connected to each other with a weak van der Waals force, and was believed to experience slippage under loading conditions, which likely accounted for the high failure strain. After mechanical stretching, the large aligned bundles were believed to be a primary component for load carrying. Due to the densely packed structure, it was believed that the movement of the bundles was difficult, which may have resulted in the very small failure strain, as shown at FIG. 4.

The iodine doping further improved the mechanical performance because the UTS improved by about 25% to 489 MPa for the 35% stretched CNT sheets, and by 33% to 154 for the randomly oriented CNT sheets of the examples. The Young's modulus after stretching and doping was improved to 130 GPa for the doped 35% stretched CNT sheets (FIG. 5), which was about 5 times higher than the value of undoped random CNT sheets having a Young's modulus of 26 GPa. The mechanical performance of the doped 35% stretched CNT sheets was believed to be improved due, at least in part, to the densely packed structure and CNT alignment, which was believed to preserve the integrity of the nanotube networks after stretching and doping.

Electrical property measurements were conducted using a source (Keithley 6221) and nanovoltmeter (Keithley 2182A) in a four-probe configuration.

Resistivity (ρ) was calculated from the slope of the I-V curve based on the following equation:

$$\rho = R \cdot w \cdot t / d,$$

wherein R is resistance, and w and t are the width and thickness of the sample, and d is the distance between the two inner probes. All calculations were based on the assumption that the CNT sheets had a rectangular cross-section.

Energy-dispersive X-ray spectroscopy (EDS) was used to evaluate the iodine doping quality by verifying the distribution of iodine in random and stretched CNT sheets. For the in-plane distribution, EDS of doped random and stretched samples clearly showed that the iodine was evenly distributed across the entire sample surface. For the through-thickness distribution of iodine, the cross-sectional EDS images of both random and stretched samples showed a homogeneous distribution of iodine after doping, which was believed to indicate that iodine was deposited on the surface and penetrated inside the random and stretched CNT networks.

Transmission Electron Microscopy (TEM) micrographs demonstrated that most of the CNT bundles were uniformly covered by iodine, which was believed to indicate that the iodine was deposited on the surface and inside the random and stretched CNT networks, likely due to their porous nature and/or vapor phase doping process of Example 2.

TEM images and elemental mapping from energy-filtered TEM were taken using the JEM-ARM200cF (JEOL) at 80 kV with GIF camera (Gatan).

Scanning electronic microscope (SEM, JSM-7401F, JEOL.) with EDS for elemental mapping was used for morphology analysis.

Thermogravimetric analysis (TGA) before and after doping was conducted in a Q50 (TA Instrument Inc.) with a 10° C./minute rate. TGA was used to evaluate the amount of iodine that was absorbed by the CNT sheets as a result of the doping process of Example 2.

Temperature dependent electrical resistivity was measured using a conventional four-probe method from 300 K to 4 K using a physical properties measurement system (PPMS, Quantum Design). The iodine desorption peak was 105° C. and the random CNT sheets had an iodine percentage of 13.2%, by weight, while the 35% stretched CNT sheets had an iodine percentage of 11.0%, by weight, as shown at Table 1.

TABLE 1

TGA data of doped random and 35% stretched CNT sheets.

| | | Degrade temperature (° C.) | |
|---|---|---|---|
| | Iodine(%) | Start | End |
| Doped random CNT | 13.2 ± 1.7 | 42.5 ± 2.0 | 197.9 ± 8.0 |
| Doped 35% stretched CNT | 11.0 ± 1.0 | 41.5 ± 1.7 | 208.3 ± 3.8 |

As a result, it was believed that at least a 10%, by weight, doping level of iodine was achieved by the process of Example 2 without causing any substantial physical damage to the structure of the CNT sheets. This was believed to demonstrate the effectiveness of the vapor phase doping process of Example 2, especially as compared to a liquid doping process, which typically necessitates harsh conditions to achieve a high doping level. The high doping level achieved by the process of Example 2 was believed to indicate that the iodine vapor allowed penetration of the CNT sheet by the iodine molecules.

Figure 6:
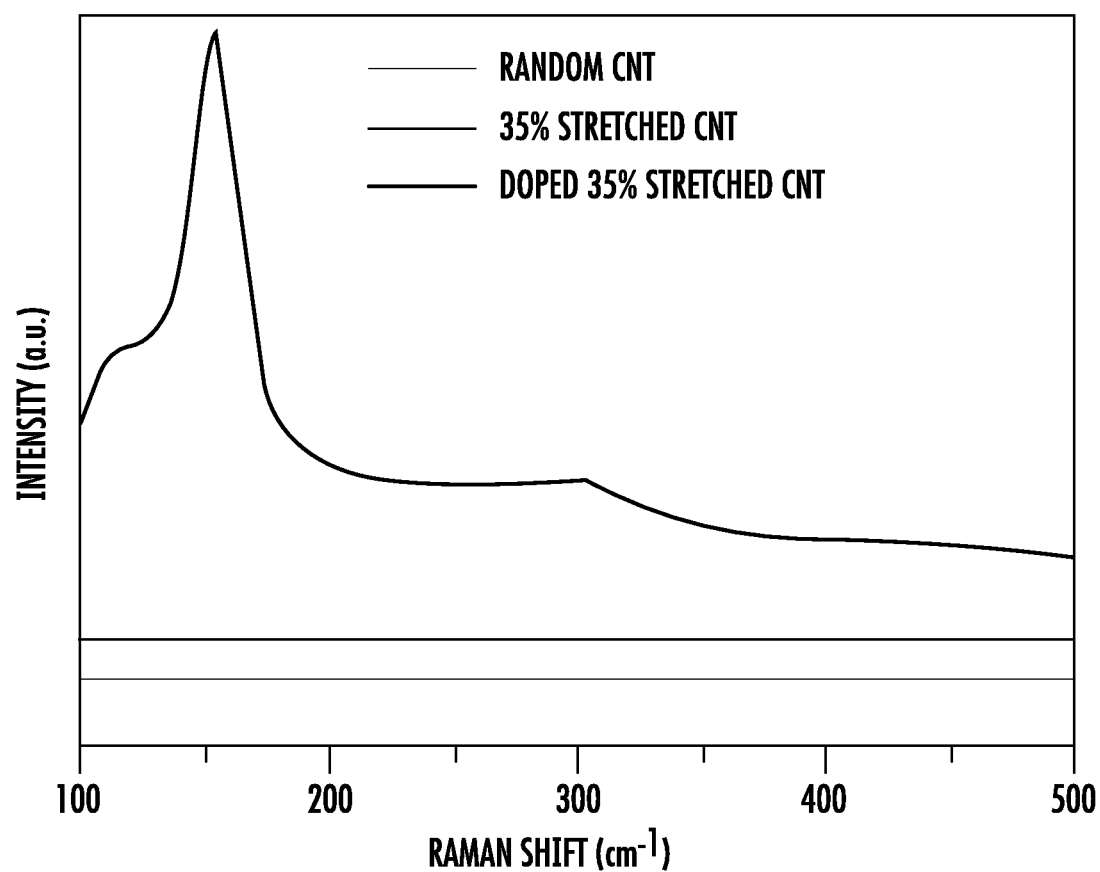
FIG. 6 depicts Raman spectroscopy data (radial breathing mode (RBM)) for an embodiment of a randomly oriented CNT sheet, one embodiment of a stretched CNT sheet, and one embodiment of a doped and stretched CNT sheet.

Raman analysis was done by a Renishaw inVia micro-Raman system using a 785 nm excitation wavelength. The Raman spectroscopy results depicted at FIG. 6 and FIG. 7 included several unique peaks, which were believed to be related to iodine doping. An apparent feature peak after doping was observed at 153 cm$^{-1}$, as shown at FIG. 6, for doped 35% stretched CNT sheets of Example 3. This feature peak was not seen in the un-doped randomly oriented CNT sheet or the undoped 35% stretched samples, and was believed to be attributed to iodide anion formation of triiodide ($I_3^-$) and/or pentaiodide ($I_5^-$).

Figure 7:
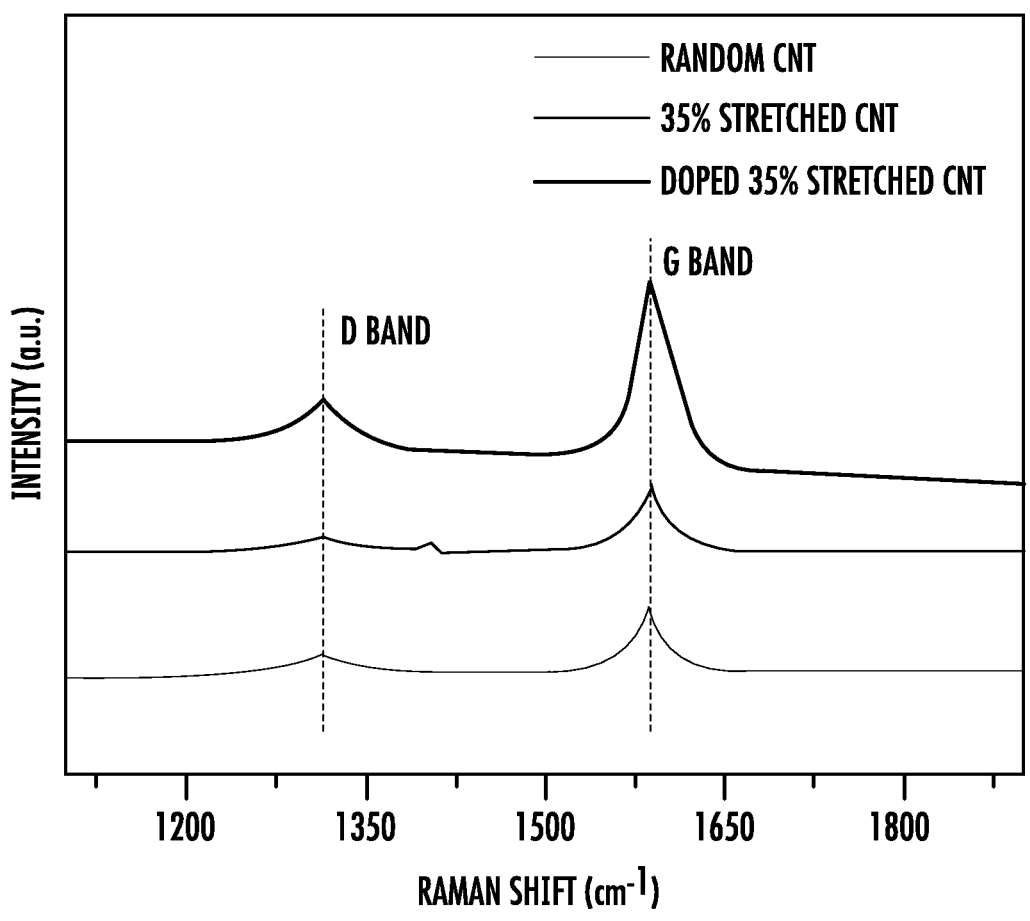
FIG. 7 depicts Raman spectroscopy data (D band and G band) for an embodiment of a randomly oriented CNT sheet, one embodiment of a stretched CNT sheet, and one embodiment of a doped and stretched CNT sheet.

There also was an up-shift in the G band by 4 cm$^{-1}$ from 1583 cm$^{-1}$ to 1587 cm$^{-1}$ for doped 35% stretched CNT sheets, as shown at FIG. 7, as compared to undoped random and 35% stretched samples, which had the same peaks at 1583 cm$^{-1}$. This apparent shift towards larger wave numbers from iodine p-doping was believed to be attributed to the charge transfer between CNTs and polyiodine. A higher value of the red shift in the G band was believed to indicate a higher doping level of CNTs, which likely resulted from doping on the surfaces of the CNTs and on the bundles inside the CNT sheets. No significant discrepancies were found in the D band at 1310 cm$^{-1}$ for both random and 35% stretched CNT sheets. After iodine doping, however, the intensity of the D band for 35% stretched CNT sheets shoed an enhancement, with a higher $I_D/I_G$ ratio, which was believed to indicate more defects in the CNT structure. Covalent bonding between iodine and the CNTs may have induced the defects after doping.

In terms of hole doping of iodine, the hole concentration (n) of the iodine doped samples, as shown at Table 2, was calculated from the measured Hall coefficient ($R_H$) according to the equation:

$$R_H = -\frac{1}{ne},$$

wherein e is the electron charge. Based on hole concentration and hole mobility, the electrical conductivity (σ) was defined by:

$$\sigma = ne\mu,$$

wherein μ is the hole mobility. After iodine doping, the hole concentrations of random and 35% stretched samples were 2.90×10$^{19}$ cm$^{-3}$ and 2.67×10$^{19}$ cm$^{-3}$, respectively, which were one order of magnitude higher than that of their undoped counterparts (Table 2).

TABLE 2

Hall measurements of doped CNT sheets.

| | Random CNT | Doped random CNT | 35% stretched CNT | Doped 35% stretched CNT |
|---|---|---|---|---|
| Carrier concentration (cm$^{-3}$) | 1.65 × 10$^{18}$ | 2.90 × 10$^{19}$ | 1.62 × 10$^{18}$ | 2.67 × 10$^{19}$ |
| Carrier mobility (cm$^2$/V-s) | 959 | 689 | 2312 | 2805 |

The difference in hole concentrations between the doped random and 35% stretched CNT sheets of the examples possibly originated from the different iodine doping levels.

As shown at Table 1, 13.2%, by weight, of iodine was present in the doped random CNT sheet samples, which was higher than the 11.0%, by weight, in the doped 35% stretched CNT sheet. Moreover, the doped 35% stretched CNT sheets had the largest carrier mobility at about 2800 cm$^2$V$^{-1}$s$^{-1}$ out of all the samples listed at Table 2.

During the doping process, the iodine doping level was believed to plateau, possibly to the limited specific surface area of the CNT sheets. This was believed to indicate that when the available surface sites of CNTs were exposed to iodine, the chemical and physical interactions occurred quickly, and then gradually reached a saturated state. In other words, it was believed that the conductivity after doping approached steady-state (12,000 S/cm in the examples) likely due to the stable level of the hole concentration generated by iodine after a certain doping time.

Figure 8A:
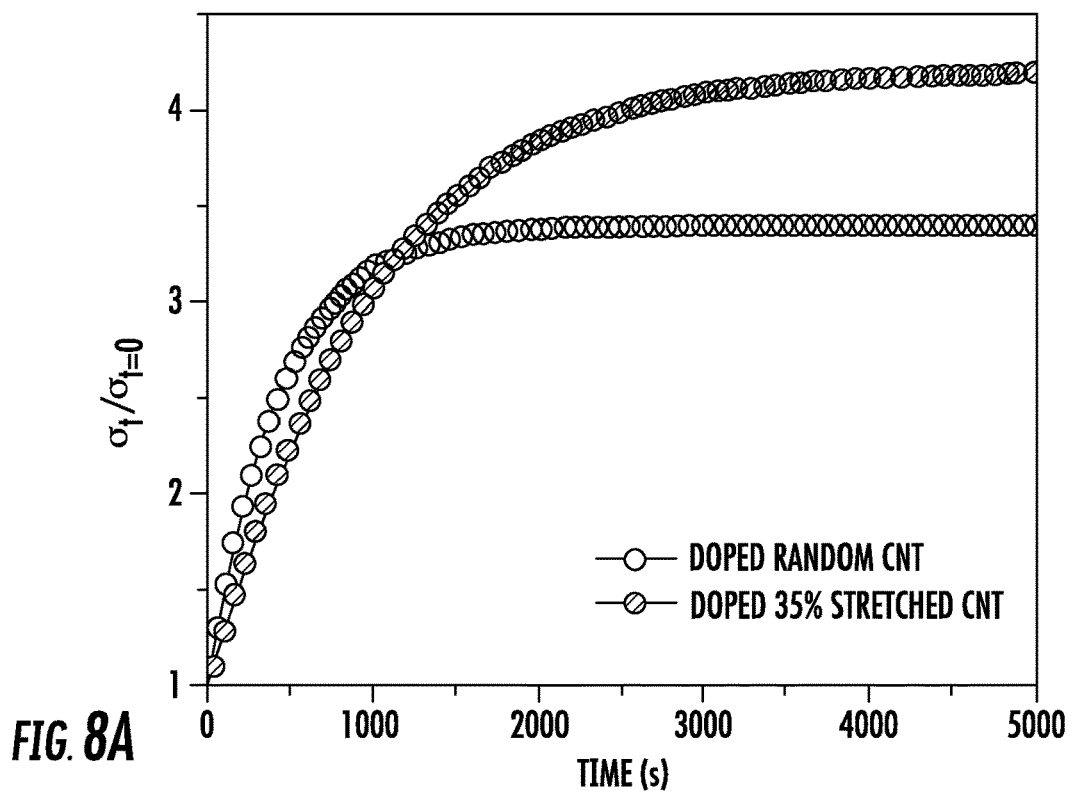
FIG. 8A depicts the relationship between time and conductivity (normalized) for one embodiment of a doped randomly oriented CNT sheet and one embodiment of a doped and stretched CNT sheet.
Figure 8B:
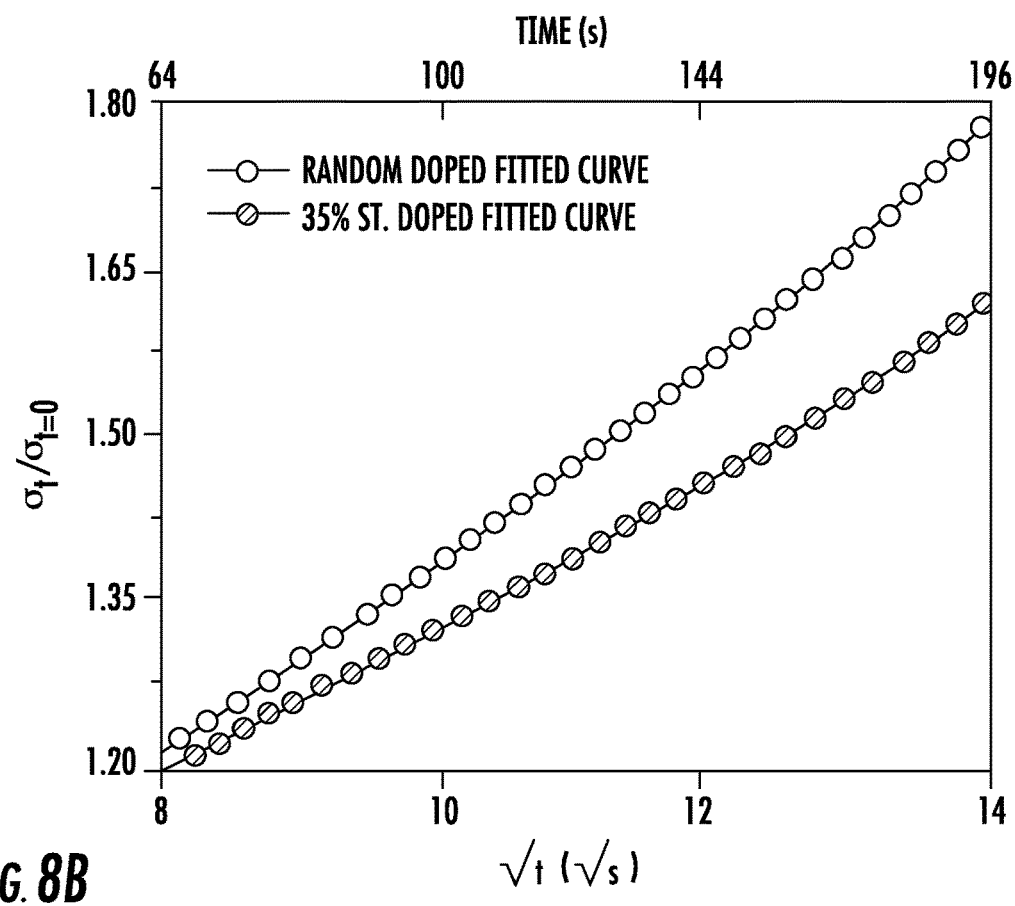
FIG. 8B depicts the relationship between conductivity and $\sqrt{t}$ for one embodiment of a doped randomly oriented CNT sheet and one embodiment of a doped and stretched CNT sheet.

Assuming one carrier per dopant, according to the equation $\sigma = ne\mu$, the electrical conductivity changed with the amount of iodine in the CNT sheets as time passed, as shown at FIG. 8A and FIG. 8B. Therefore, the following calculations may be performed:

$$\sigma = k_1 n \text{ and } n = k_2 C,$$

wherein $k_1 = e\mu$ and $k_2$ are constants, C is the iodine concentration in the doped CNT sheets, and the relationship between C and $\sigma$ could be denoted as:

$$\sigma = k_1 k_2 C.$$

At room temperature, it was believed that the iodine vapor interacted with the CNTs quickly, if not immediately, upon doping, likely due to the concentration gradient of iodine between the CNT sheets and the periphery of the CNT sheets. According to the theory of diffusion throughout a hypothetical homogeneous film, at the beginning of iodine diffusion, the iodine concentration of the doped CNT sheets of the examples was determined by the following equation:

$$\tilde{C} = \frac{4C_s}{T}\sqrt{\frac{t}{\pi}},$$

wherein $\tilde{C}$ is the average concentration of iodine, $C_s$ is the saturation concentration after an infinite time of diffusion, T is the thickness of the CNT sheet and t is the time. After a long period of diffusion, $\tilde{C}$ will follow the following equation:

$$\tilde{C} = C_s\left[1 - \frac{8}{\pi^2}\exp\left(-\frac{\pi^2 t}{T^2}\right)\right].$$

From the foregoing equations, the time dependence of electrical conductivity will adhere to the following equation:

$$\sigma = k\tilde{C}$$

wherein k is a constant. At the beginning of iodine diffusion, a short initial stage was difficult to observe, likely due to the concentration gradient of iodine. During this initial stage, a rapid improvement in the electrical conductivity occurred, which was believed to indicate a rapid increase of iodine concentration. A linear dependence of electrical conductivity on $\sqrt{t}$ was expected at the beginning of iodine diffusion. After a period of diffusion, a saturating concentration of iodine was reached.

Correspondingly, an upper boundary of electrical conductivity was expected, and can be observed at FIG. 8A.

Figure 9:
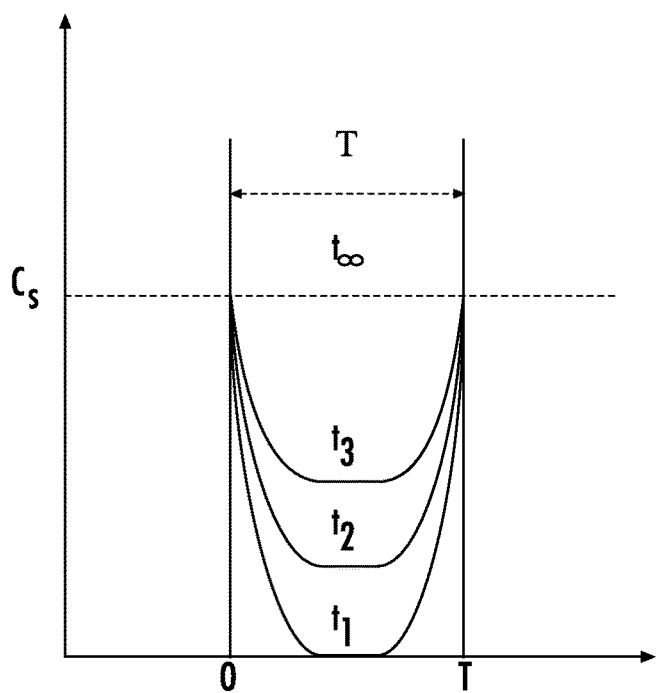
FIG. 9 depicts the theoretical iodine concentration distribution at different positions of one embodiment of a CNT sheet at different times, where a saturation concentration (Cs) was reached as the time increased.

Compared to the random CNT sheets, 35% stretched CNT sheets of the examples presented a slower doping velocity, likely due to the slower iodine penetration of the densely packed structure after mechanical stretching. FIG. 9 schematically illustrates the concentration of iodine for doped CNT sheets of the examples at different diffusion times. As the doping time increased, the concentration gradually reached a steady state (Cs), which was believed to indicate that the electrical conductivity reached an upper limit, as shown at FIG. 8A.

These results were believed to confirm the time dependence of electrical conductivity and iodine concentration levels of CNT sheets during the doping process of Example 2.

Figure 10:
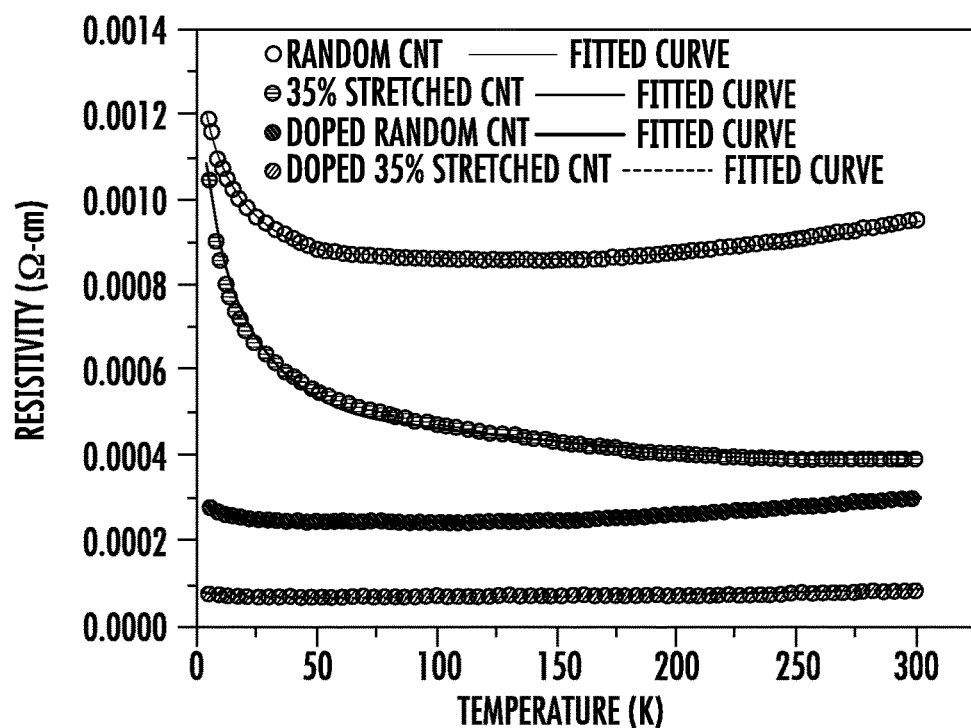
FIG. 10 depicts the temperature dependence of the resistivity for several embodiments of CNT sheets, wherein the absolute resistivity value and the simulated curve are based on a heterogeneous model.

Also measured was the effect of iodine doping on the temperature dependence of electrical conductivity of CNT samples from 300 K to 4 K. FIG. 10 depicts the temperature dependence of resistivity of the random and 35% stretched CNT sheets of the examples before and after iodine doping from 300 K down to 4 K. The high conductivity of the CNT sheets at 300 K was retained at low temperature (4 K) for all four samples, and extrapolated to a non-zero value at the zero temperature limit. The detailed conductivity values are provided at Table 3.

TABLE 3

Electrical resistivity at different temperature.

| Resistivity (×10$^{-4}$ Ω · cm) | Temperature (K) | | |
|---|---|---|---|
| | 4 | T$_c$ | 300 |
| Random CNT | 12.16 | 8.56 (124 K) | 9.47 |
| Doped random CNT | 2.78 | 2.36 (65 K) | 2.98 |
| 35% stretched CNT | 11.98 | 3.81 (247 K) | 3.89 |
| Doped 35% stretched CNT | 0.704 | 0.632 (46 K) | 0.844 |

This feature was believed to be an important signature of free charge carriers of metallic behavior.

Figure 11:
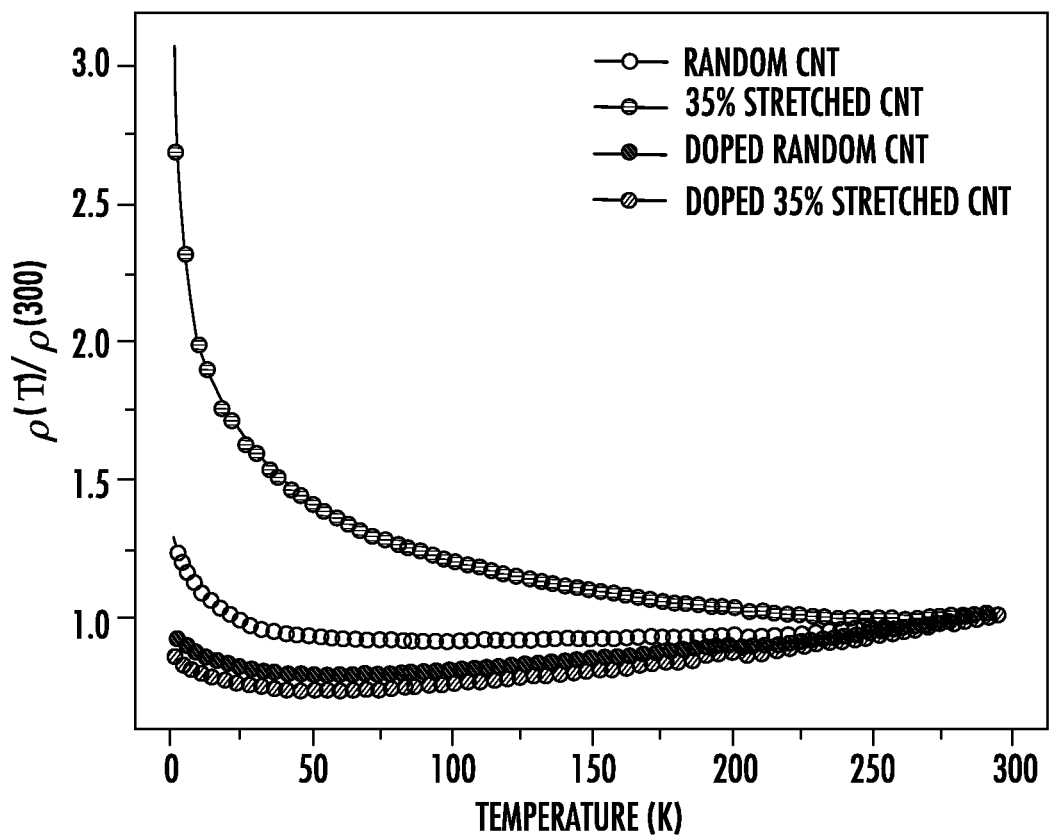
FIG. 11 depicts the temperature dependence of the resistivity (normalized resistivity) for several embodiments of CNT sheets.

Another metallic conduction behavior that was observed was the positive temperature coefficient of resistance (TCR) from the crossover temperature (Tc, the temperature at resistivity minimum) to near room temperature. These characteristics were believed to show a conduction mechanism that was dominantly like a metallic conduction for doped random and 35% stretched CNT samples of the examples at a broad temperature range from the crossover temperatures Tc at 65 K and 46 K, respectively, to 300 K. At the same time, the variation of resistivity after iodine doping was obviously smaller compared to the undoped samples of the examples, as shown at FIG. 11, which was believed to indicate a relatively weak temperature dependence. However, the small dip in resistivity at the crossover temperature (Tc) was retained and moved to a much lower temperature after iodine doping.

It was believed that the resistivity of the CNT sheets mainly occurred for two reasons: the resistance of individual CNTs and the contact resistance between CNTs, which was believed to arise from electron tunneling through the contact barrier. Resistance induced by tunneling contact barrier was believed to result from the gap between CNTs where carriers transferred from one nanotube to another within the same bundle or an adjacent bundle.

In CNT networks, carrier transporting barriers are misalignments, twist (waviness), inter-tube, or inter-bundle contacts or other defects along the CNTs. Taking into account barrier resistance given by fluctuation-assisted tunneling through thin barrier between metallic regions and the metallic resistance arising from backscattering by phonons along CNT longitudinal direction, an expression for the resistivity, described by the heterogeneous model, may be—

$$\rho(T) = \frac{1}{\sigma(T)} = B\exp\left(\frac{T_b}{T_s+T}\right) + A\exp\left(-\frac{T_m}{T}\right).$$

wherein A and B represent the geometrical factors particularly depending on the alignment of nanotubes and bundles of the CNT networks, which can be viewed as constants for particular samples.

Typical barrier energies were related with the value of $k_B T_b$ (where $k_B$ is Boltzmann's constant), and the resistivity of quantum tunneling through the barrier in low temperature limit was indicated by the value of factor $T_s/T_b$. The energy of backscattering phonons was defined by $k_B T_m$. The relevant data is plotted at FIG. 10, and Table 4 includes all of the values of the parameters.

TABLE 4

Fitting parameters of heterogeneous model.

|  | Random CNT | 35% stretched CNT | Doped random CNT | Doped 35% stretched CNT |
|---|---|---|---|---|
| $k_B T_b$ (meV) | 0.4848 | 0.2481 | 0.1323 | 0.0484 |
| $T_s/T_b$ | 1.828 | 1.921 | 2.552 | 4.363 |

Since the resistivity minimum moved to a lower temperature after iodine doping, the metallic temperature dependence was dominant and primarily contributed to the temperature-dependent metallic term in the foregoing equations. As expected, barrier energies $k_B T_b$ between metallic regions increased as resistivity increased.

Considering the same magnitude of carrier concentration of doped samples, the smaller value of $T_s/T_b$ in random samples was possibly due to the disorder scattering from the misalignment of nanotubes, which was believed to suggest a smaller fraction of delocalized carriers contributing to the conductivity. However, the 35% stretched samples of the examples had a higher value of $T_s/T_b$, which was believed to indicate that delocalized metallic carriers significantly contributed to the total conductivity and possibly explain the high conductivity because of CNT alignment.

The high alignment and dense packing were believed to allow delocalized carriers to transport from one conductive region to another or from one individual CNT to another because of the more compact structure and short junction length. Therefore, the conduction nature of CNT networks after iodine doping was believed to be metallic, and interrupted by thin barriers through which tunneling occurs.

In view of the foregoing, it was believed that the possible synergistic effects of high alignment and dense structure with shorter junction lengths and high carrier concentration resulting from iodine doping provided the doped 35% stretched CNT sheets of the examples with a higher electrical conductivity than all other samples.

We claim:

1. A composite material comprising:
   a carbon nanoscale fiber network (i) comprising a plurality of substantially aligned carbon nanoscale fibers, (ii) having a stretch ratio of 10% to 70%, and (iii) having a thickness of about 10 μm to about 50 μm;
   a dopant adsorbed to one or more surfaces of the carbon nanoscale fiber network, dispersed within the carbon nanoscale fiber network, or a combination thereof; and
   a capping layer disposed on at least one surface of the carbon nanoscale fiber network;
   wherein the dopant is present in the composite material in an amount of about 1% to about 25% by weight, based on the combined weight of the dopant and the plurality of substantially aligned carbon nanoscale fibers, and the composite material has an electrical conductivity of about 5,000 S/cm to about 50,000 S/cm.

2. The composite material of claim 1, wherein the carbon nanoscale fiber network is a rolled carbon nanoscale fiber network or a pressed carbon nanoscale fiber network.

3. The composite material of claim 1, wherein the dopant is present in an amount of about 10% to about 25% by weight, based on the total weight of the plurality of carbon nanoscale fibers and the dopant.

4. The composite material of claim 1, wherein the dopant comprises an oxidant.

5. The composite material of claim 4, wherein the oxidant is selected from $I_2$, ICl, $SOCl_2$, $HNO_3$, HCl, or a combination thereof.

6. The composite material of claim 1, wherein the carbon nanoscale fiber network is a sheet or a ribbon, and the capping layer is disposed substantially evenly on both sides of the sheet or the ribbon, respectively.

7. The composite material of claim 1, wherein the capping layer comprises a conductive polymer.

8. The composite material of claim 7, wherein the conductive polymer comprises poly (3,4-ethylenedioxythiophene) polystyrene sulfonate (PEDOT:PSS).

9. The composite material of claim 1, wherein the plurality of substantially aligned carbon nanoscale fibers comprises single-wall carbon nanotubes, multi-wall carbon nanotubes, or a combination thereof.

10. The composite material of claim 1, wherein the plurality of substantially aligned carbon nanoscale fibers comprises functionalized carbon nanoscale fibers.

11. The composite material of claim 1, wherein the electrical conductivity of the composite material is about 10,000 S/cm to about 20,000 S/cm.

12. A composite material comprising:
   a carbon nanoscale fiber network comprising a plurality of substantially aligned carbon nanoscale fibers, wherein the carbon nanoscale fiber network is a rolled carbon nanoscale fiber network or a pressed carbon nanoscale fiber network, and the carbon nanoscale fiber network has a stretch ratio of 10% to 70%, and a thickness of about 10 μm to about 50 μm;
   a dopant adsorbed to one or more surfaces of the carbon nanoscale fiber network, dispersed within the carbon nanoscale fiber network, or a combination thereof; and
   a capping layer disposed on at least one surface of the carbon nanoscale fiber network;
   wherein the dopant is present in the composite material in an amount of about 10% to about 25% by weight, based on the combined weight of the dopant and the plurality of substantially aligned carbon nanoscale fibers, and the composite material has an electrical conductivity of about 10,000 S/cm to about 50,000 S/cm.

13. The composite material of claim 12, wherein the dopant comprises an oxidant.

14. The composite material of claim 13, wherein the oxidant is selected from $I_2$, ICl, $SOCl_2$, $HNO_3$, HCl, or a combination thereof.

15. The composite material of claim 12, wherein the carbon nanoscale fiber network is a sheet or a ribbon, and the capping layer is disposed substantially evenly on both sides of the sheet or the ribbon, respectively.

16. The composite material of claim 12, wherein the capping layer comprises a conductive polymer.

17. The composite material of claim 12, wherein the conductive polymer comprises poly (3,4-ethylenedioxythiophene) polystyrene sulfonate (PEDOT:PSS).

18. The composite material of claim 1, wherein the dopant comprises an oxidant, and the dopant is present in the composite material at an amount of about 10% to about 20%, by weight, based on the weight of the composite material.

\* \* \* \* \*